US005648947A

United States Patent [19]
Hamaguchi et al.

[11] Patent Number: 5,648,947
[45] Date of Patent: Jul. 15, 1997

[54] OPTICAL DISK DEVICE HAVING TRACK JUMPING CONTROL

[75] Inventors: Shingo Hamaguchi; Eiji Yabuki, both of Kawasaki, Japan

[73] Assignee: Fujitsu Limited, Kawasaki, Japan

[21] Appl. No.: 410,340

[22] Filed: Mar. 24, 1995

[30] Foreign Application Priority Data

Aug. 9, 1994 [JP] Japan .................................. 6-187092

[51] Int. Cl.⁶ ........................................... G11B 7/085
[52] U.S. Cl. ............................. 369/44.28; 369/54
[58] Field of Search .................. 369/44.25, 44.28–44.29, 369/54, 58

[56] References Cited

U.S. PATENT DOCUMENTS 5,442,607  8/1995  Suzuki ......................... 369/44.29 X
5,457,671 10/1995  Takata et al. ................. 369/44.28
5,477,513 12/1995  Onodera et al. .............. 369/44.28

FOREIGN PATENT DOCUMENTS 3-173939  7/1991  Japan .

*Primary Examiner*—W. R. Young
*Attorney, Agent, or Firm*—Greer, Burns & Crain, Ltd.

[57] ABSTRACT

An optical disk device in which a moving state of a beam irradiating position is detected during the operation of an optical head in response to a jump signal, and in which an acceleration signal and a deceleration signal for said optical head are corrected based on a detection result for the subsequent jump operation, resulting in canceling an individual difference or the variation of the characteristic of the optical head.

7 Claims, 10 Drawing Sheets

OPTICAL DISK DEVICE HAVING TRACK JUMPING CONTROL

BACKGROUND OF THE INVENTION

1. Field of the Invention

The present invention relates to an optical disk device in which jump control is performed so as to make a light beam irradiating position move to an adjacent recording track at every rotation of an optical disk.

2. Description of Related Art

In an optical disk device, a data is recorded or reproduced by irradiating a recording track on an optical disk with a light beam such as a laser beam and receiving a reflected light beam from the recording track. In such an optical disk device, an on-track control is performed for holding a light beam irradiating position on a desired recording track, and a focus control is performed for focusing the light beam on the recording track. In recording or reproducing, a seek control is performed for moving the light beam irradiating position from the currently irradiating recording track that is held by the on-track control to another desired recording track.

For the on-track control and the seek control, the light beam irradiating position is required to be moved along the direction of the radius of the optical disk (hereinafter referred to as the radial direction). An optical head for emitting the light beam has, as means for moving the light beam irradiating position in the radial direction, an actuator for changing the position of an objective lens opposing the optical disk and another actual, or for moving the entire optical system in the radial direction. For the on-track control where the light beam irradiating position is moved by a small distance, the former actuator is used, and for the seek control where the light beam irradiating position is moved by a long distance across a plurality of recording tracks, the latter actuator is used.

The recording track on a general optical disk, however, is outwardly formed in a spiral shape, and hence, when the on-track control is performed on the spirally formed recording track, the light, beam irradiating position is gradually moved outward as the optical disk rotates. A data is recorded in or reproduced from a given area on art optical disk in many cases. Therefore, in order to shorten an access time of the optical head in the recording/reproducing operation, the light beam irradiating position is desired to maintain its current position.

Due to the above-mentioned fact, in a conventional optical disk device, jump control is performed so as to allow the light, beam irradiating position to jump to the inner adjacent recording track at each rotation of the optical disk during a wait period between the recording/reproducing operations. The jump control can be regarded as a kind of the seek control because the light beam irradiating position is moved between the recording tracks. For the jump control, however, the actuator used for the on-track control is utilized because the light beam irradiating position is limited to jump the distance bet,ween the adjacent recording tracks and the on-track control is naturally canceled for performing the jump control.

In a writable optical disk device, it is necessary to return the light beam irradiating position to the previous recording track in performing the reproducing operation for confirming the recorded contents. The jump control is performed also in such a case.

FIG. 1 is a diagram showing the configuration of a mechanism for driving an objective lens in an ordinary optical head. As strewn in FIG. 1, an objective lens 10 of the optical head is fixed on a lens holder 12, which is penetrated by a supporting axis 11. The supporting axis 11 has an axial center that is substantially vertical to the recording surface of an optical disk (not; shown) disposed above the supporting axis 11. The supporting axis 11 is penetrated through the lens holder 12 so that the lens holder 12 slide along the axial length direction and be movable around the axial center of the supporting axis 11. The objective lens 10 is fixed on the lens holder 12 so that the optical axis of the objective lens 10 be parallel to the axial center of the supporting axis 11 and, namely, be vertical to the recording surface of the optical disk.

Below the objective lens 10 is disposed a starting mirror 13. The starting mirror 13 reflects a light beam emitted by a fixed optical system (not shown) in the direction parallel to the optical axis of the objective lens 10 so as to lead the reflected light beam to the optical disk, and also reflected s a light beam, which has reflected by the optical disk to proceed along the optical axis of the objective lens 10, in the reverse direction, so as to lead the reflected light, beam to the fixed optical system. A data is recorded or reproduced by using the light beam as a medium.

On the outer surface of the lens holder 12 are provided a focus actuator 14 to be used for the focus control and a track actuator 15 to be used for the on-track control and the jump control.

The focus actuator 14 comprises a pair of, i.e., N and S, permanent magnets aligned along the axial length direction of the supporting axis 11 and a driving coil on the side of the magnets closer to the supporting axis 11. When the driving coil is supplied with power, a force along the axial length direct ion of the supporting axis 11 is applied to the lens holder 12 in a magnetic field formed by the permanent magnets. Due, to the force, the objective lens 10 fixed on the lens holder 12 is displaced toward or away from the optical disk so as to focus the light beam on a recording track on the optical disk. Thus, the focus control is performed by control of supplying power to the focus actuator 14.

The track actuator 15 also comprises a pair of, i.e., N and S, permanent magnets aligned vertically to the axial length direction of the supporting axis 11 and a driving coil on the side of the magnets closer to the supporting axis 11. When the driving coil is supplied with power, a force in the direction of a tangent line of the supporting axis 11 is applied to the lens holder 12 in a magnetic field formed by the permanent magnets. Due to the force, the lens holder 12 is rotated around the axial center of the supporting axis 11, thereby displacing the objective lens 10 fixed on the lens holder 12 in a plane substantially parallel to the recording surface of the optical disk. Thus, the on-track control and the jump control are performed by displacing the objective lens 10 through the control of supplying power to the track actuator 15 so that the light beam irradiating position on the optical disk can be moved in the radial direction.

The above-described, conventional jump control is generally conduced by the following procedure: For the movement of the light beam irradiating position by a known distance between the adjacent recording tracks, an acceleration time for the optical bead and an equivalent deceleration time are previously set. The track actuator 15 is supplied, at each rotation of the optical disk, with a jump signal including an acceleration signal and a deceleration signal respectively corresponding to the set acceleration and deceleration Lime.

In this method, the behavior of the track actuator 15 in response to the jump signal is assumed to be uniform. The track actuator 15, however, is actually affected by unstable external forces such as a friction resistance between the supporting axis 11 and the lens holder 12 and a resistance of an extension line for supplying power to the driving coil. In addition, mechanical deviation can be caused in the position of the center of gravity of the lens holder 12, a winding resistance of the driving coil and the positions to mount, the driving coil and the permanent magnets. Accordingly, the behavior characteristics of the track actuator 15 cannot be prevented from varying from one optical disk to another.

Therefore, the processing accuracy and the assembling accuracy of each part of the track actuator 15 is conventionally increased so as to decrease the mechanical deviation as much as possible. The remaining causes of deviation, which cannot be canceled by increasing the accuracy, is absorbed by initially adjusting the continuation time of the acceleration signal and the deceleration signal in the control system of the jump control, so as to perform the jump control accurately. This results in a decrease in productivity of the optical disk devices, and is one of the factors to prevent the decrease of the production cost of the optical disk devices.

Further, even when the above-mentioned countermeasure is taken, the behavior characteristic of the track actuator 15 is varied by external factors such as the change of the surrounding environment in actual use and the variation of the power supply voltage, and is also varied with time. Accordingly, it is difficult, to continuously perform appropriate jump control for a long period of time.

Japanese Patent Application Laid-Open No. 3-173939 (1991) discloses a method for a jump control. In this method, the light beam irradiating position is detected to be passed through a middle point between the tracks to be jumped, during the jumping operation in response to an acceleration signal, and the acceleration signal is switched to a deceleration signal in response to the detection of the passage. In this manner, by varying the jumping state based on the actual operation of the track actuator 15, the mechanical deviation is canceled, thereby complying with the variation of the behavior characteristic due to the external factors or with time. This method, however, has a disadvantage that an error can be caused in the position of the light beam irradiating position after finishing the acceleration due to the delay of the rise of the deceleration signal and the speed before switching the acceleration signal.

The aforementioned Japanese Patent Application Laid-Open No. 3-173939 (1991) also discloses to suspend the generation of the deceleration signal in response to the detection of arrival of the light beam irradiating position at a target track during the deceleration operation. This means that an error is caused in the stop position of the light beam irradiating position as described above. Even when the deceleration signal is suspended when the light beam irradiating position reaches the target track, an error can still be caused. Thus, accurate jump control cannot be realized by such a method.

SUMMARY OF THE INVENTION

The present invention was devised to solve the aforementioned problems. The objective of the invention is providing an optical disk device in which an individual difference in a behavior characteristic of an actuator and unreliability of a jump control due to error factors during the operation are canceled without requiring high processing and assembling accuracy, thereby improving the productivity and decreasing the production cost.

The optical disk device of the invention comprises an optical head for irradiating a spirally formed recording track with a light beam, jump signal generating means for generating a jump signal including an acceleration signal for accelerating the optical head, a deceleration signal corresponding to the acceleration signal and a halt period between the acceleration signal and the deceleration signal, jump detecting means for detecting a moving state of a light beam irradiating position in response to the jump signal, and a jump controller for correcting the acceleration signal and the deceleration signal based on a detection result obtained by the jump detecting means.

Further, in the optical disk device of the invention, the jump controller corrects the acceleration signal and the deceleration signal based on output time for the acceleration signal and the deceleration signal.

Accordingly, during the operation of the optical head in response to the jump signal outputted by the jump controller, the acceleration signal and the deceleration signal are corrected on the basis of the movement (jump) of the light beam irradiating position on the optical disk. In the subsequent jump operation, the corrected acceleration and deceleration signals are outputted with the halt period therebetween, thereby operating the optical head.

Furthermore, in the optical disk device of the invention, the jump detecting means detects a speed at which the light beam irradiating position passes through the substantial middle point between the recording tracks where the light beam irradiating position is positioned before and after the jump, and the jump controller makes a correction so that the speed detected by the jump detecting means accord with a predetermined target speed. Alternatively, the jump detecting means detect a time at which the light beam irradiating position passes through the middle point between the recording tracks where the light beam irradiating position is positioned before and after the jump, and the jump controller includes means for calculating a speed at which the light beam irradiating position passes through the middle point based on the detected result obtained by the jump detecting means and the output time for the acceleration signal and makes a correction so that, the calculated passing speed accord with a predetermined target speed.

Accordingly, the passing speed used in the correction is detected by the jump detecting means to be supplied to the jump controller, or is calculated by the jump controller by using the passing time detected by the jump detecting means and the output time for the acceleration signal.

Further, a predetermined reference value is set for the halt period. When a halt period newly defined through the correction has a smaller value than the reference value, the predetermined target speed used in the correction is decreased so that the halt period cannot be less than the predetermined reference value.

Therefore, when the halt period is smaller than the predetermined value as a result of the correction, a sufficient halt period is ensured by reducing the target speed used in the correction. Thus, the deceleration in response to the deceleration signal is always started while the light beam irradiating position is moving at a fixed speed, thereby preventing causing an error in the position where the light beam irradiating position is located after the jump.

The above and further objects and features of the invention will more fully be apparent from the following detailed description with accompanying drawings.

DESCRIPTION OF THE PREFERRED EMBODIMENTS

Figure 2:
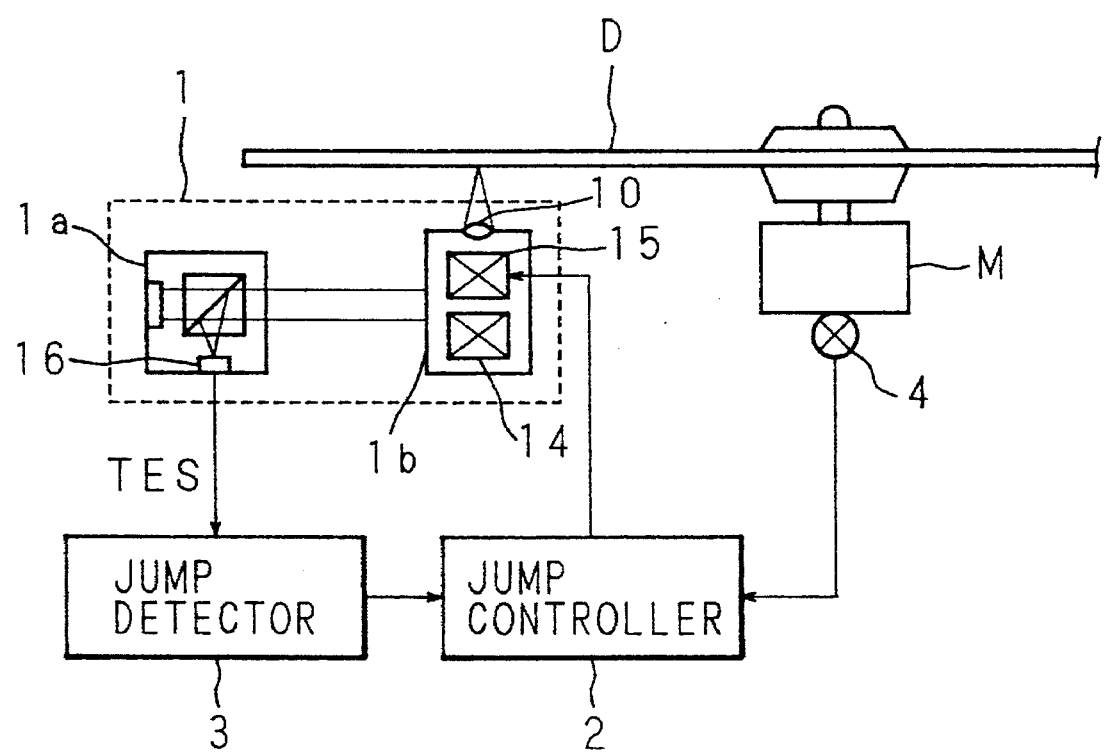
FIG. 2 is a block diagram showing the entire configuration of an optical disk device according to the invention.

The present invention will now be described referring to the accompanying drawing illustrating the embodiments thereof. FIG. 2 is a block diagram showing the entire configuration of an optical disk device of the invention. As is shown in FIG. 2, the optical disk device of the present invention comprises an optical disk D rotated by a motor M and an optical head 1 opposing the recording surface of the optical disk D.

An optical system including a light emitting unit and a light receiving unit for a light beam is built in the optical head 1. Specifically, the optical head 1 comprises a fixed optical system 1a fixed on the outside of the rotation area of the optical disk D, and a movable optical system 1b that includes a driving mechanism (i.e., a focus actuator 14 and a track actuator 15) for an objective lens 10 having the configuration as shown in FIG. 1 and is disposed movably along the recording surface of the optical disk D in the radial direction.

In such an optical disk device, a data is recorded/reproduced in the following manner: A light, beam emitted by the light emitting unit of the fixed optical system 1a irradiates the recording surface of the optical disk D via the objective lens 10 of the movable optical system 1b. A reflected light beam from the recording surface is led to the fixed optical system 1a via the objective lens 10 of the movable optical system 1b so as to be received by the light receiving unit therein. At this point, the position of the objective lens 10 against the optical disk D is determined in the radial direction by the movement, of the movable optical system 1b, and in the circumferential direction by the rotation of the optical disk D caused by the drive of the motor M. Thus, data can be recorded in or reproduced from the entire recording surface.

Figure 1:
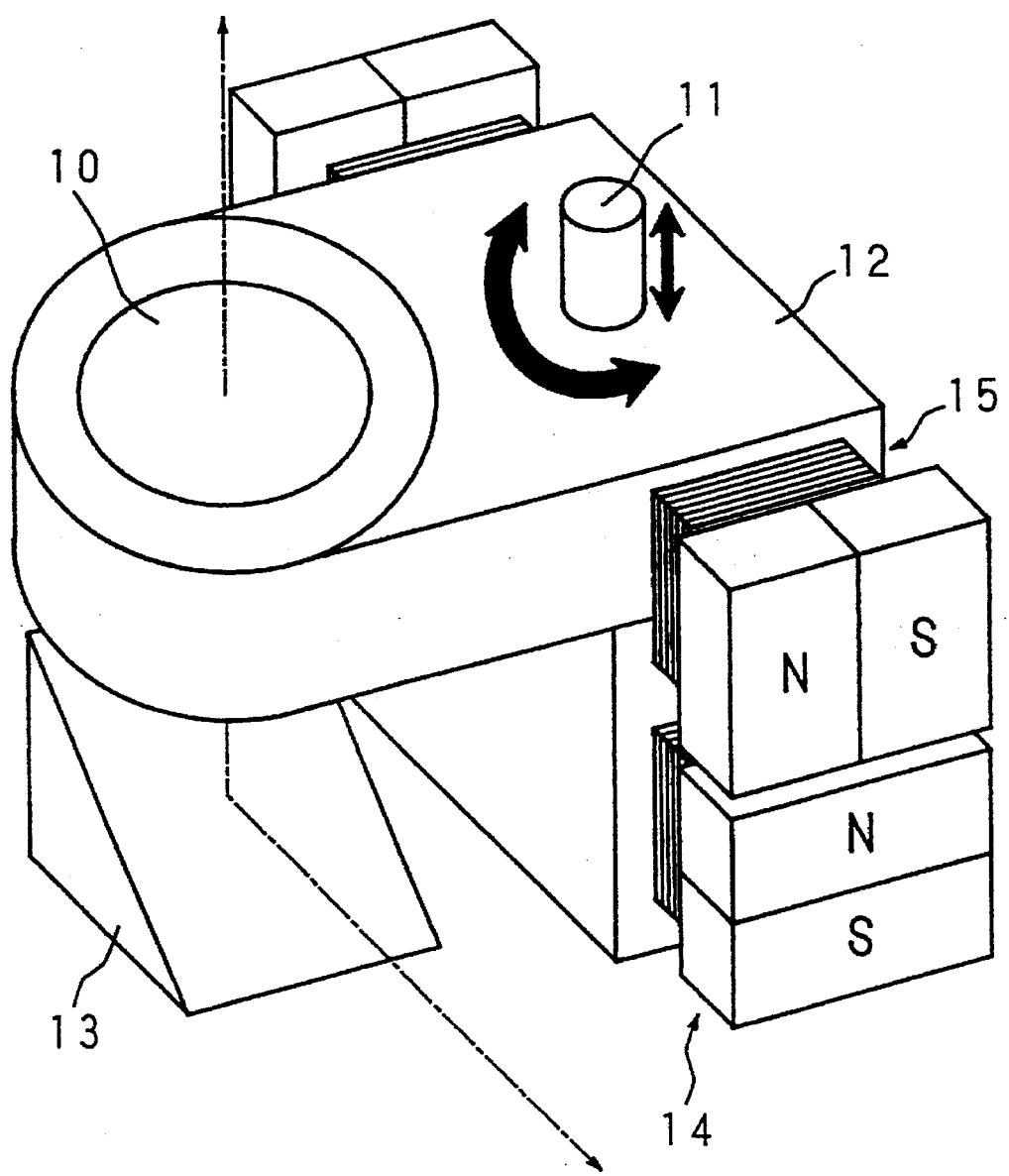
FIG. 1 is a diagram showing the configuration of a mechanism for driving an objective lens of an ordinary optical head.

During such a recording/reproducing operation, the focal point of the light beam emitted through the objective lens 10 is controlled (focus-controlled) by the operation of the focus actuator 14 having the configuration as shown in FIG. 1, so as to be positioned on the recording surface of the optical disk D. The light beam irradiating position is controlled ( on-track-control led ) by the operation of the track actuator 15 having the configuration as shown in FIG. 1, so as to track a recording track spirally formed on the recording surface. Further, the movement of the light beam to a desired recording track for the reproducing/recording operation is controlled (seek-control led) by the operation of an actuator (not shown) provided so as to move the movable optical system 1b in the radial direction.

The optical disk device shown in FIG. 2 has a controller (not shown) for the aforementioned control, and also has a jump controller 2 and a jump detector 3, which are characteristics of the invention. The jump controller 2 controls the movement of the light beam irradiating position to the inner adjacent recording track at each rotation of the optical disk D, in order to prevent the light beam irradiating position from moving outward gradually by performing the on-track control during a wait period between the reproducing/recording operations.

The input part of the jump controller 2 is supplied with an output signal of the jump detector 3 and an output, signal of a rotation detector 4, which is disposed on the motor M for driving the optical disk D). The output of the jump controller 2 is supplied to the track actuator 15 in the movable optical system 1b of the optical head 1. The jump detector 3 processes an output signal of a photosensor 16 disposed in the fixed optical system 1a, a so as to detect the moving state of the light beam irradiating position caused by the operation of the jump controller 2.

The photosensor 16 is a known sensor having, within the fixed optical system 1a, a pair of photodetectors, which are positioned so that, the interfaces thereof match with the end of the reflected light path from the optical disk D. The photosensor 16 is used, in the aforementioned on-track control and the seek control, for the purpose of obtaining a track error signal (TES) corresponding to positional deviation of the light beam irradiating position front the center of a recording track, based on the light amounts detected by the respective photodetectors.

Figure 3:
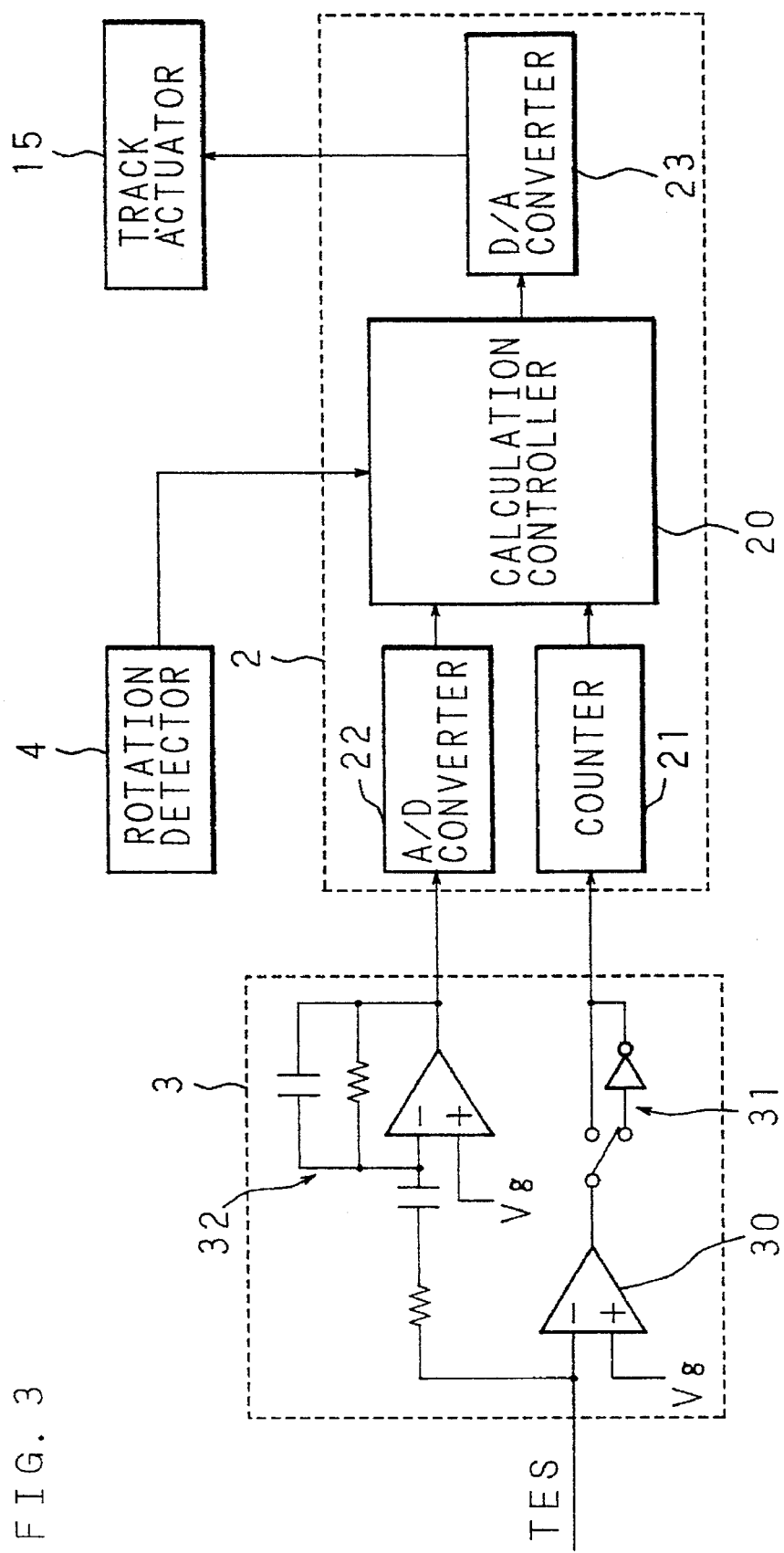
FIG. 3 is a block diagram showing the configuration of a jump controller and a jump detector according to a first embodiment of the invention.

FIG. 3 is a block diagram showing an exemplified configuration of the jump controller 2 and the jump detector 3. As is shown in FIG. 3, the jump detector 3 comprises a comparator 30 for comparing the TES supplied by the photosensor 16 with a predetermined reference voltage $V_s$, an inverting circuit 31 that, is connected to the output part of the comparator 30 and includes a switch and a NOT circuit, and a differentiating circuit 32 connected in parallel with the comparator 30 and the inverting circuit 31. The jump detector 3 supplies the jump controller 2 with a binarized value of the TES obtained through the comparator 30 and a differentiated value of the TES obtained through the differentiating circuit 32.

Figure 4:
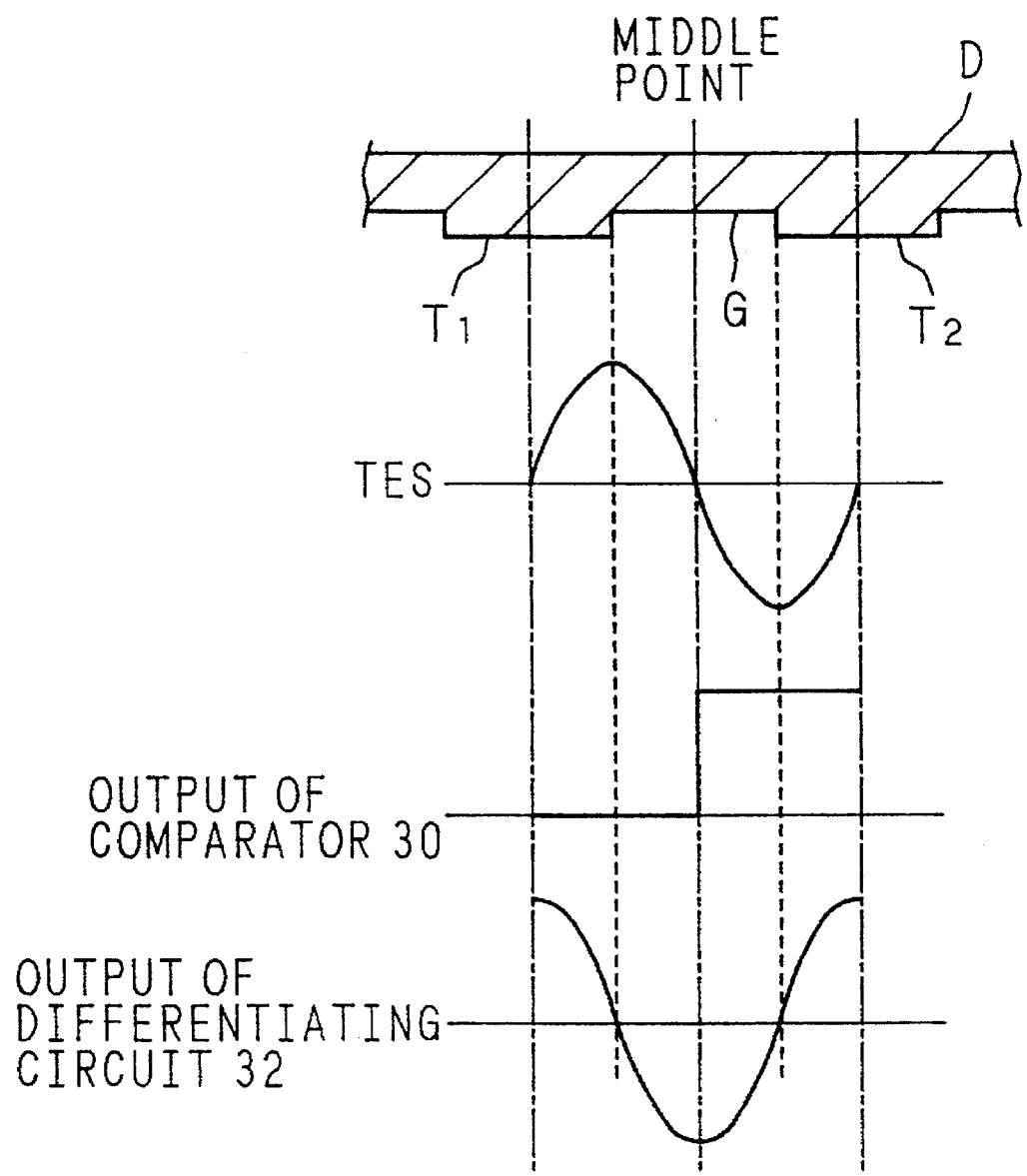
FIG. 4 shows the variation of the input to and the output from the jump detector according to the embodiment of the invention.

FIG. 4 shows the variation of the input, to and the output from the jump detector 3 caused by the movement of the light beam irradiating position between recording tracks $T_1$ and $T_2$ formed adjacent, to each other on the optical disk D. As is shown in FIG. 4, the recording tracks $T_1$ and $T_2$ on the optical disk D are formed as convex parts separated from each other by a concave groove G having a predetermined depth. The light beam irradiating the optical disk D is controlled to be focused on the surfaces of the recording tracks $T_1$ and $T_2$ by the focus control. Therefore, the light amounts detected by the pair of photodetectors of the photosensor 16 are maximum when the light beam irradiating position is on the recording track $T_1$ or $T_2$, and minimum when it is on the concave groove G.

Accordingly, the TES, which is obtained as a difference signal between the light amounts detected by the photosensor, is at zero level when the light beam irradiating position is positioned in the center of the recording track $T_1$ or $T_2$ as is shown in FIG. 4. As the light beam irradiating position moves toward the other recording track $T_2$ or $T_1$, the TES increases or decreases, and becomes the maximum or the minimum on the border with the concave groove G. Then, the TES decreases or increases with further movement, becomes zero level in the center of the concave groove G, and changes in the reverse manner from then on to be at the zero level again when the light beam irradiating position reaches the center of the recording track $T_2$ or $T_1$.

The reference voltage $V_g$ of the comparator 30 is set by using the TES at, 0 level as the reference. The output of the comparator 30 is, therefore, a binarized signal having a rise or a fall at a time when the light beam irradiating position is positioned in the center of the concave groove G, i.e., at the zero cross point in the midpoint of the recording tracks $T_1$ and $T_2$ adjacent to each other.

The inverting circuit 31, which is connected to the output part of the comparator 30, is required, in the seek control where the light beam irradiating position is moved in both directions, for always using the zero cross point as a rise point. Therefore, the inverting circuit 31 is inherently unnecessary in the jump control where the light beam irradiating position is always moved in one direction (i.e., inwardly) alone. In the seek control, the switch the inverting circuit 31 is operated in response to a switching signal generated by the jump controller 2 in accordance with the direction of the movement, of the light beam irradiating position. Thus, the output, of the comparator 30 is directly transferred or inverted by the NOT circuit. As a result, the passage of the light beam irradiating position through the middle point between the recording tracks $T_1$ and $T_2$ is always treated as a rise point or a fall point.

The other output of the jump detector 3, i.e., the output signal of the differentiating circuit 32, is obtained as the differentiated value of the TES having a peak at the zero cross point as shown in FIG. 4. The peak value corresponds to the gradient of the TES at the zero cross point, that is, the moving speed of the light beam irradiating position passing through the middle point between the recording tracks $T_1$ and $T_2$ (hereinafter occasionally referred to as the middle point passing speed).

The jump controller 2 receiving these output, signals supplies a jump signal to the track actuator 15 to move the objective lens 10, thereby moving the light beam irradiating position on the recording surface of the optical disk D. The jump controller 2 comprises a calculation controller 20 using a microprocessor, a counter 21 and an analog/digital (A/D)) convert 22 that are connected to the input parts of the calculation controller 20, and a digital/analog (D/A) converter 23 connected to the output part of the calculation controller 20.

The calculation controller 20 is a major part of the jump controller 2 for generating the jump signal, and is supplied with one output of the jump detector 3, i.e., the output signal of the comparator 30 (or the inverting circuit 31), via the counter 21. The output of the comparator 30 is, as described above, a binarized signal having a rise or a fall at the middle point between the adjacent recording tracks $T_1$ and $T_2$. The counter 21 counts up the number of the rise or the fall to supply the counted result to the calculation controller 20. Thus, the calculation controller 20 can recognize the number of the recording tracks that have been crossed by the moving light beam irradiating position based on the input from the counter 21.

The counter 21 is required when also the seek control for moving the light beam irradiating position over a plurality of recording tracks is desired to be performed. In the case where the jump controller 2 is desired for the jump control alone, the counter 21 is omitted so that the output signal of the comparator 30 be directly supplied to the calculation controller 20. Then, the calculation controller 20 can recognize whether or not the light beam irradiating position has passed through the middle point between the adjacent recording tracks $T_1$ and $T_2$ based on the level change of the output signal of the comparator 30.

The other output of the jump detector 3, i.e., the output signal of the differentiating circuit 32, is supplied to the calculation controller 20 via the A/D converter 22. The output of the differentiating circuit 32 is, as described above, a differentiated value of the TES varying in accordance with the movement of the light beam irradiating position between the recording tracks $T_1$ and $T_2$. The A/D converter 22 converts the output signal into a digital signal that can be processed by the calculation controller 20. The input from the A/D converter 22 is used in the calculation controller 20 as a signal corresponding to the moving speed of the light beam irradiating position to pass through the middle point between the recording tracks $T_1$ and $T_2$ (i.e., the middle point passing speed).

The D/A converter 23 connected to the output part of the calculation controller 20 converts the jump signal, which is generated as a digital signal through a calculation in the calculation controller 20 described in detail below, into an analog signal required for the operation of the track actuator 15. For the jump control, the objective lens 10 is moved by the operation of the track actuator 15 in accordance with the jump signal, thereby moving the light beam irradiating position on the optical disk to the inner adjacent recording track at each rotation of the optical disk D.

The jump controller 2 is also supplied with an output signal of a rotation detector 4 disposed on the motor M for driving the optical disk D. The jump controller 2 recognizes the rotation position of the optical disk D based on this output signal, and generates a predetermined jump signal at each rotation of the optical disk D. Also, the jump controller 2 recognizes the moving state of the light beam irradiating position according to the jump signal based on the input from the jump detector 3, and corrects the jump signal on the basis of the detected moving state.

Figure 5:
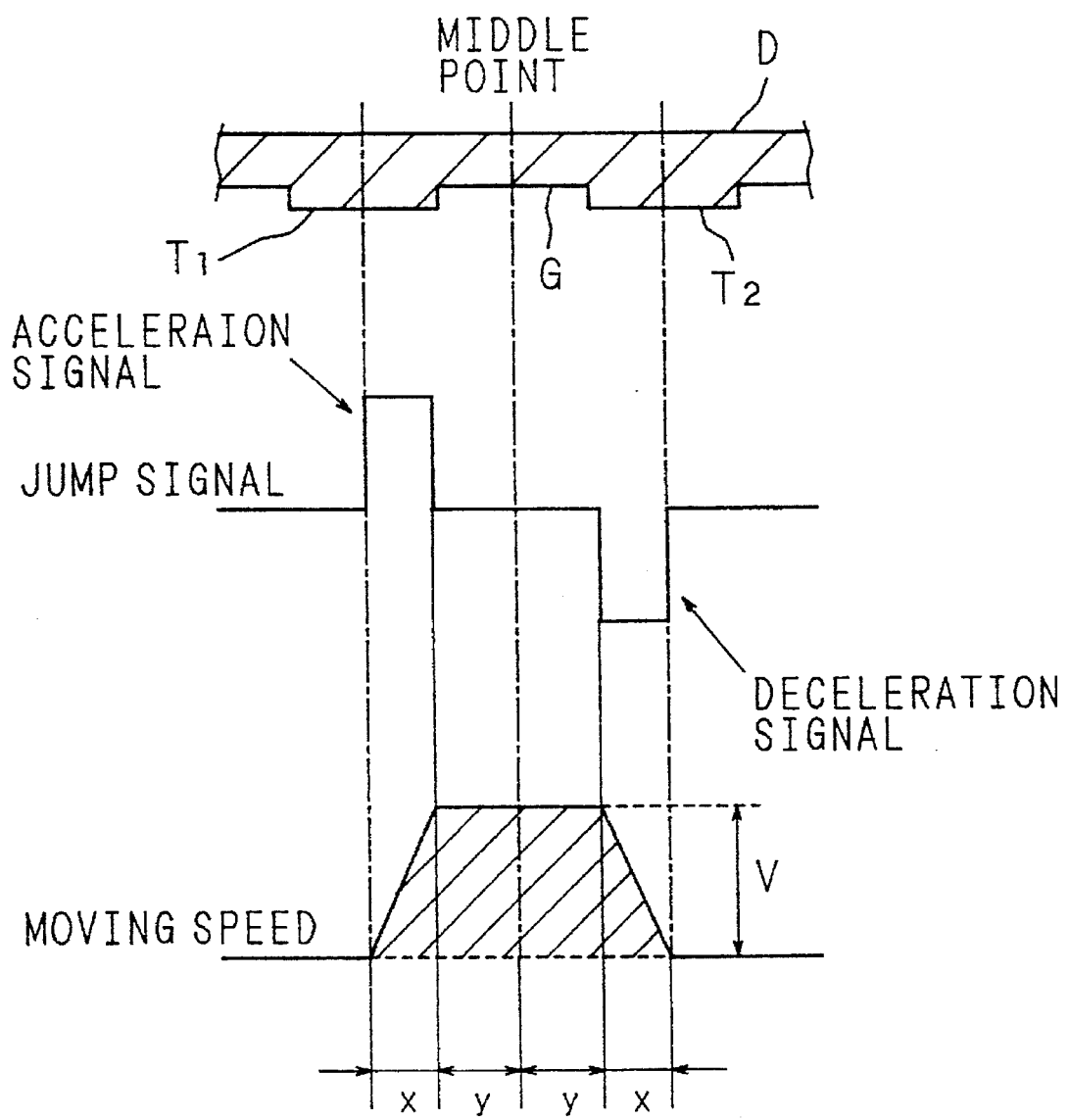
FIG. 5 shows the variation of the moving speed of a light beam irradiating position in response to a jump signal in the first embodiment.

FIG. 5 illustrates the jump signal generated by the jump controller 2 and the variation of the moving speed of the light beam irradiating position in response to the jump signal. The jump signal includes an acceleration signal and a deceleration signal each having predetermined output time and a halt period between the acceleration signal and the deceleration signal. The light beam irradiating position on the recording track $T_1$ is started to move by accelerating the optical head 1 in response to the acceleration signal. The moving speed of the light beam irradiating position after this acceleration is maintained for the halt period, and is then decelerated in response to the deceleration signal so that the light beam irradiating position can be positioned on the adjacent recording track $T_2$.

Such a movement (i.e., jump) of the light beam irradiating position can be attained by setting the output time for the acceleration signal and the deceleration signal so that a distance that the light beam irradiating position moves during the output time including the halt period therebetween be equal to a known distance between the recording tracks $T_1$ and $T_2$. Actually, the characteristic of the track actuator 15 contributing to the movement of the light beam irradiating position is deviated and varied with time. Therefore, it is impossible to make the light beam irradiating position accurately jump by using merely jump signal uniquely determined.

Figure 6:
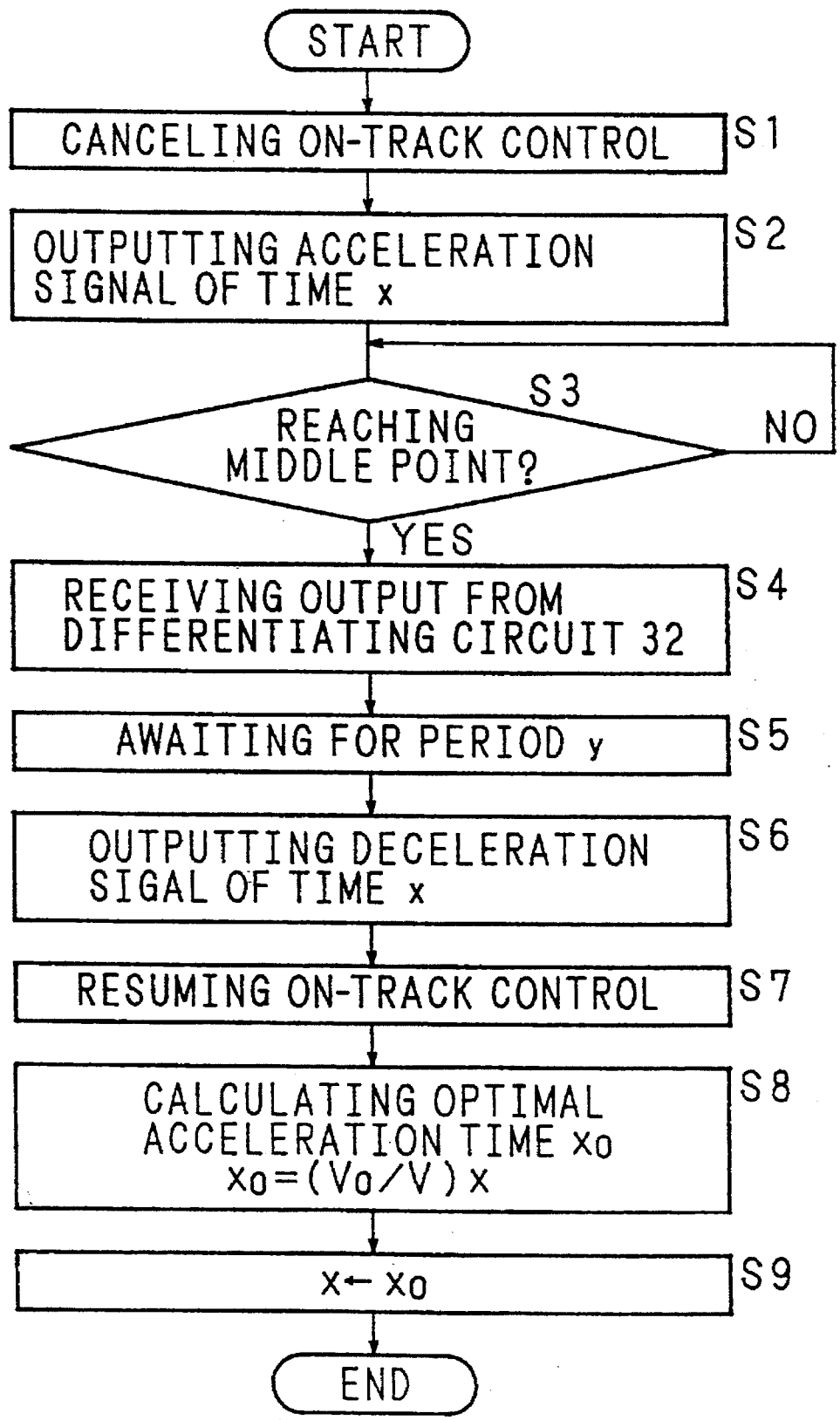
FIG. 6 is a flow chart showing the operation of the jump controller of FIG. 3.

Therefore, the jump signal is corrected by the jump controller 2 so as to change the output time for the acceleration signal and the deceleration signal, thereby canceling the deviation of the characteristic of the track actuator 15 and always attaining accurate jump. FIG. 6 is a flow chart showing the operation of the jump controller 2, more specifically, the operation of the calculation controller 20.

The operation according to this flow chart is conducted during a wait period between the reproducing/recording operations at each rotation of the optical disk D recognized by the input from the rotation detector 4. The calculation controller 20 cancels the on-track control for holding the light beam irradiating position on a recording track (step S1), and then outputs an acceleration signal having output time x (step S2). After finishing this output, while monitoring the passage of time by counting time with a built-in timer, the calculation controller 20 receives the output, of the comparator 30 in the jump detector 3, thereby determining whether or not the light beam irradiating position has reached the middle point between the recording tracks $T_1$ and $T_2$ ( step S3 ).

As a result of the determination at step S3, when it, is determined that the light beam irradiating position has reached the middle point, the calculation controller 20 receives the output of the differentiating circuit 32 in the jump detector 3 (step S4), and awaits for a period y that is equal to time from the output halt of the acceleration signal to the determination, i.e., time equal to that counted by the built-in timer (step S5). Then, the calculation controller 20 outputs a deceleration signal also having the output time x (steps S6), and resumes the on-track control (step 7).

Through the aforementioned operation, the jump controller 2 outputs the jump signal including the acceleration signal and the deceleration signal each having the time x and the halt period 2y therebetween, thereby operating the track actuator 15 in accordance with the jump signal so as to move the light beam irradiating position. A moving distance during this operation corresponds to a hatched area in FIG. 5, and can be accurately managed by making the fixed moving speed after finishing the acceleration, i.e., the middle point passing speed V, accord with a previously set target speed $V_0$.

The output of the differentiating circuit 32 received at the step S4 corresponds to the middle point passing speed V. After reaching step S7, the calculation controller 20 calculates an optimal acceleration time $x_0$ required to make the middle point passing speed V obtained through this operation, accord with the target speed $V_0$ by using the following equation (step S8).

$$x_0 = (V_0/V)x \quad (1)$$

Then, the output time x for the acceleration signal and the deceleration signal is updated into the calculated time $x_0$ so that the calculated acceleration time $x_0$ be used as the acceleration time (and deceleration time) in the subsequent jump control (step S9). Thus, the procedures are finished.

The thus updated output time x is used for the acceleration signal and the deceleration signal generated in the steps S2 and S6 in the subsequent jump operation. As a result,, the middle point passing speed V becomes substantially equal to the target speed $V_0$, and hence, the light beam irradiating position can accurately jump between the adjacent recording tracks $T_1$ and $T_2$ regardless of the characteristic of the track actuator 15. Further, since the optimization calculation in steps S8 and S9 is conducted at every jump, the influence by the characteristic variation with time of the track actuator 15 can also be eliminated.

Figure 7:
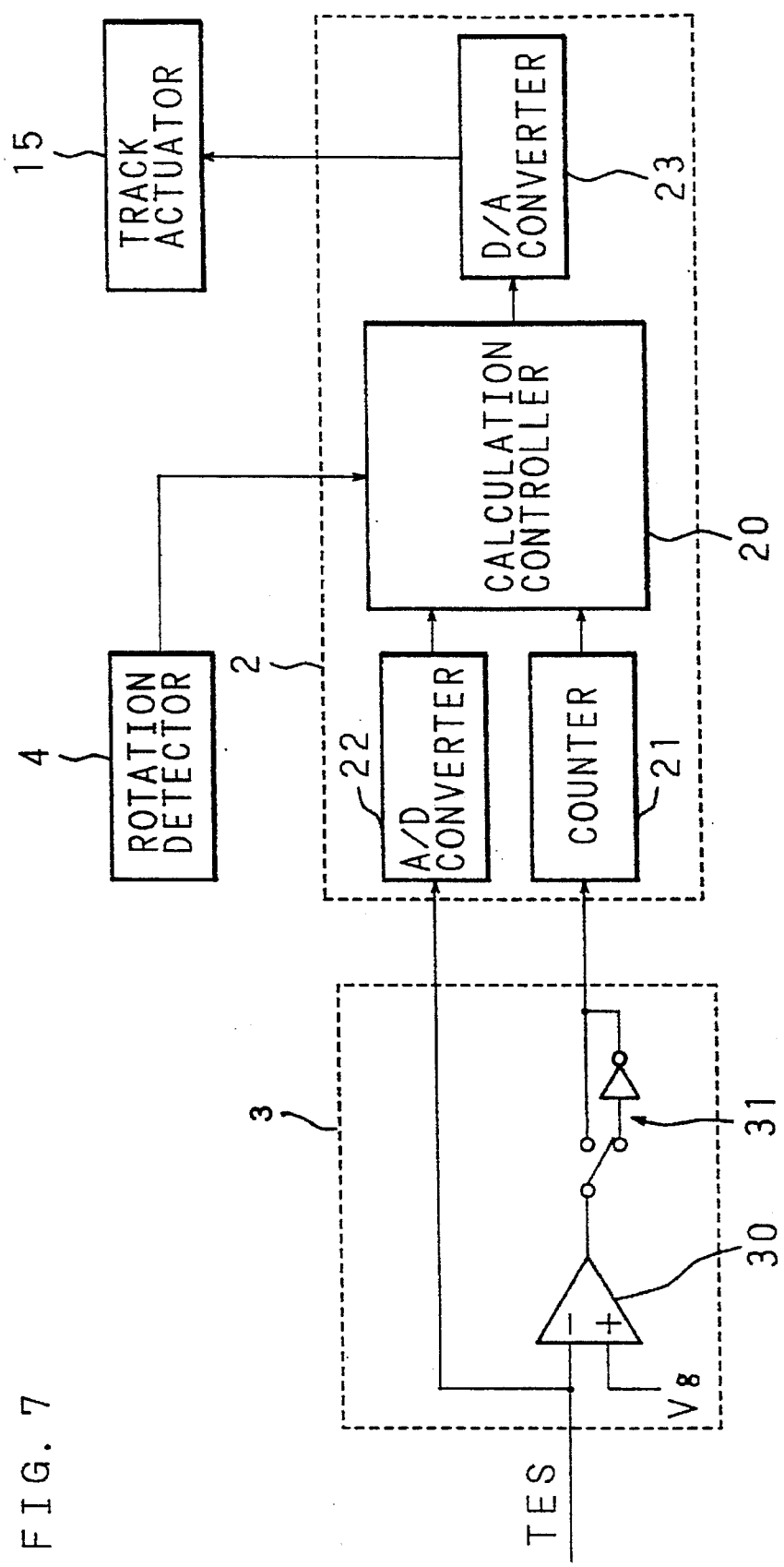
FIG. 7 is a block diagram showing the configuration of a jump controller and a jump detector according to a second embodiment.

FIG. 7 is a block diagram showing another exemplified configuration of the jump controller 2 and the jump detector 3. In this embodiment the jump detector 3 comprises a comparator 30 for comparing the TES supplied by the photosensor 16 with a predetermined reference voltage $V_g$ and an inverting circuit 31 that is connected to the output, part of the comparator 30 and includes a switch and a NOT circuit. This jump detector 3 does not comprise the differentiating circuit 32 shown in FIG. 3, and the jump controller 2 is directly supplied with the TES as well as a binarized value of the TES obtained through the comparator 30.

The jump controller 2 which receives these output signals comprises a calculation controller 20 using a microprocessor, a counter 21 and an A/D converter 22, which are connected to the input parts of the calculation controller 20, and a D/A converter 23 connected to the output part of the calculation controller 20. One output of the jump detector 3, i.e., the output signal of the comparator 30, is supplied to the calculation controller 20 via the counter 21, and the other output of the jump detector 3, i.e., the TES, is digitally converted by the A/D converter 22 to be supplied to the calculation controller 20.

The output signal from the comparator 30 is used, the calculation controller 20, to recognize whether or not the light beam irradiating position has passed through the middle point between the recording tracks $T_1$ and $T_2$ as described above. The TES is used for calculating the middle point passing speed V. The calculation controller 20 is operated in accordance with a flow chart shown in FIG. 8.

The operation according to this flow chart is conducted during a wait period between the reproducing/recording operations at each rotation of the optical disk D. The calculation controller 20 cancels the on-track control for holding the light beam irradiating position on a recording track (step S11), and then outputs an acceleration signal having output: time x (step S12). After finishing this output, the calculation controller 20 receives the output signal of the comparator 30 and the TES, both of which are supplied by the jump detector 3, stores the latter in a first register (step S13), and decides whether or not the light beam irradiating position has reached the middle point between the recording tracks $T_1$ and $T_2$ by using the former (step S14). These procedures are repeated.

As a result of the decision at step S14, when the light beam irradiating position is decided to have reached the middle point, the calculation controller 20 receives the TES supplied by the jump detector 3 immediately after the decision, and stores it in a second register (step S15). The calculation controller 20 awaits for a period y equal to the time from the output halt of the acceleration signal to the decision (step S16), and then, outputs a deceleration signal also having the output time x which is equal to the acceleration signal (step S17), and resumes the on-track control ( step S18).

After finishing the aforementioned procedures, the calculation controller 20 calculates the middle point passing speed V by using values A and B stored in the first and second registers as follows (step S19):

$$V = (B-A)/\Delta t \quad (2)$$

The values A and B stored in the first and second registers are obtained in the above-mentioned manner, and correspond to the levels of the TES received immediately before and after the light beam irradiating position passes through the middle point between the recording tracks $T_1$ and $T_2$. In equation (2), $\Delta t$, indicates a sampling frequency of the TES, and the calculation result of the right side of equal, ion (2) indicates the gradient of the TES at, the zero cross point, i.e., the middle point passing speed V.

The thus calculated middle point passing speed V is used in calculating optimal acceleration time $x_0$ by using equation (1) (step S20). The output, time x for the acceleration signal and the deceleration signal is updated into the acceleration time $x_0$ (step S21) so that the optimal acceleration time $x_0$ be used as the acceleration time (and the deceleration time) in the subsequent jump control. Thus, the procedures are finished.

In this manner, the differentiating circuit 32 is omitted in the jump detector 3 in this embodiment to attain the same effect. Thus, the configuration of the jump detector 3 can be simplified.

Furthermore, the middle point passing speed V can be calculated not using the TES but using merely the output signal of the comparator 30 corresponding to a timing data of the light beam irradiating position passing through the middle point. This method will now be described.

When it is assumed that the passage through the middle point by the acceleration for time x is detected a period y after finishing the acceleration, the light beam irradiating position during this period moves at the speed pattern as is shown in FIG. 5. Therefore, a distance L to the middle point corresponds to the hatched area in FIG. 5, and is represented by equation (3) including the middle point passing speed V, which is represented by equation (4).

$$L = 0.5Vx + Vy \tag{3}$$

$$V = 2L/(x+2y) \tag{4}$$

In these equations, x has a known value as the output time for the acceleration signal, and y is obtained by the output signal from the comparator 30. The distance L to the middle point also has a known value as a half of the distance between the adjacent recording tracks $T_1$ and $T_2$. The middle point passing speed V can be calculated by substituting these values in equation (4).

Accordingly, the same effect as described above can be attained by omitting the input of the TES to the jump controller 2 in this case. This results in that there is no need to provide the A/D converter 22 for converting the TES, and hence, the configuration of the jump controller 2 can, be simplified.

The halt period 2y from the finish of the acceleration to the start of the deceleration is required to compensate the delay for converting a driving current for the acceleration into a driving current for the deceleration. In setting the optimal acceleration time $x_0$ to obtain the target speed $V_0$ as described above, if the track actuator 15 which has excellent acceleration performance is used, the light beam irradiating position can move too fast to reach the middle point before finishing the acceleration. In such a case, it might be impossible to provide a sufficient halt period.

In order to overcome this disadvantage, a necessary and minimum halt period $y_1$ and upper limit acceleration time $x_1$ corresponding to the halt period $y_1$ are previously set. Then, at step S8 in the flow chart of FIG. 6 or at step S20 in the flow chart of FIG. 8, namely, after calculating the optimal acceleration time $x_0$, if the calculated time $x_0$ exceeds the upper limit acceleration time $x_1$, the calculation controller 20 performs correction calculation for optimal acceleration time $x_0'$ by the following equation:

$$x_0' = \frac{-\alpha y_1 + \alpha^2 y_1^2 + \alpha L}{\alpha} \tag{5}$$

In equation (5), $\alpha$ indicates average acceleration (=V/x) during the acceleration time. The upper limit acceleration time $x_1$ can be calculated by the following equation obtained by substituting y with $y_1$ and V with $V_0$ in the equation (3):

$$x_1 = 2L/V_0 - y_1 \tag{6}$$

Figure 8:
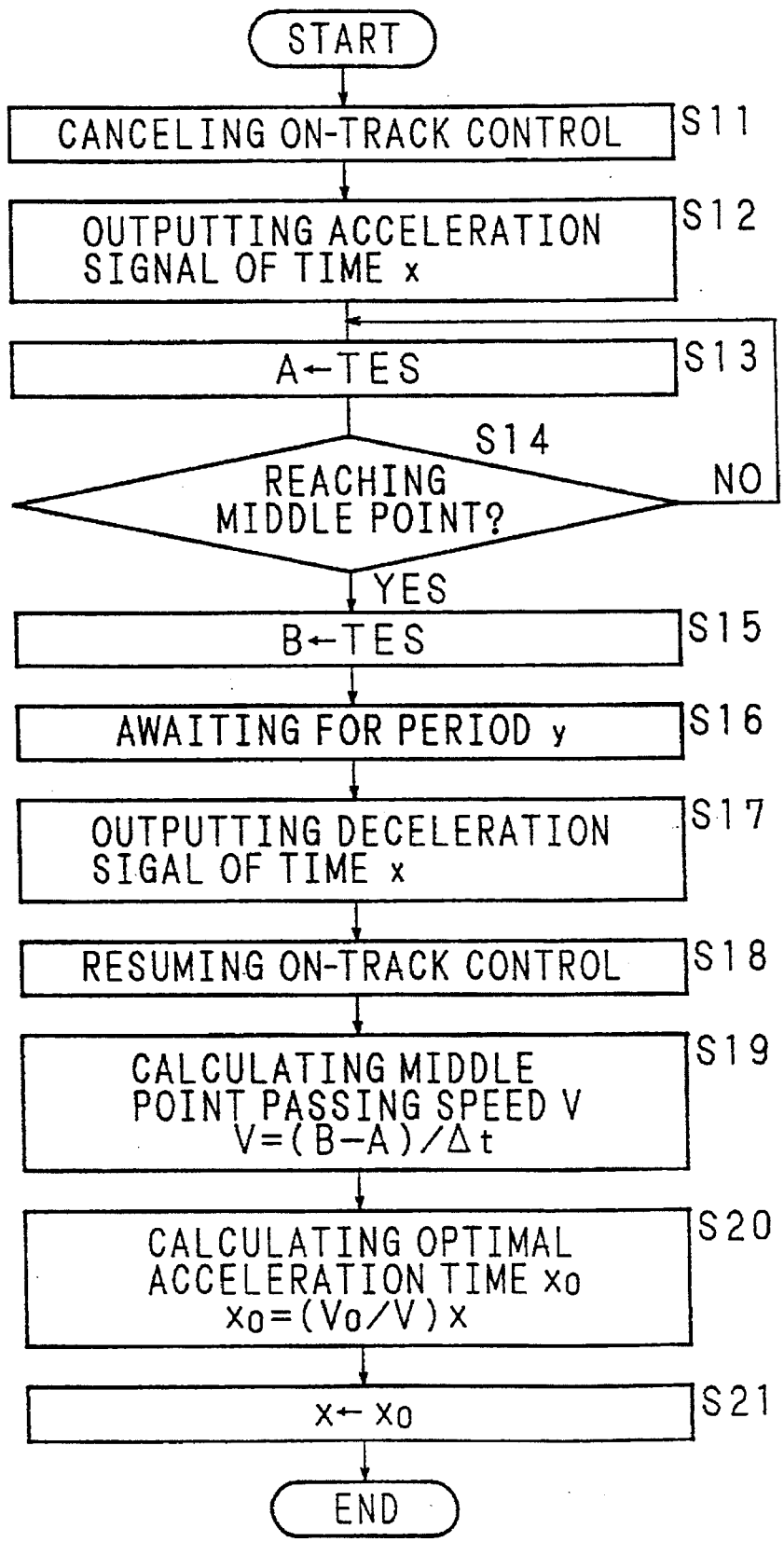
FIG. 8 is a flow chart showing the operation of the jump controller of FIG. 7.
Figure 9:
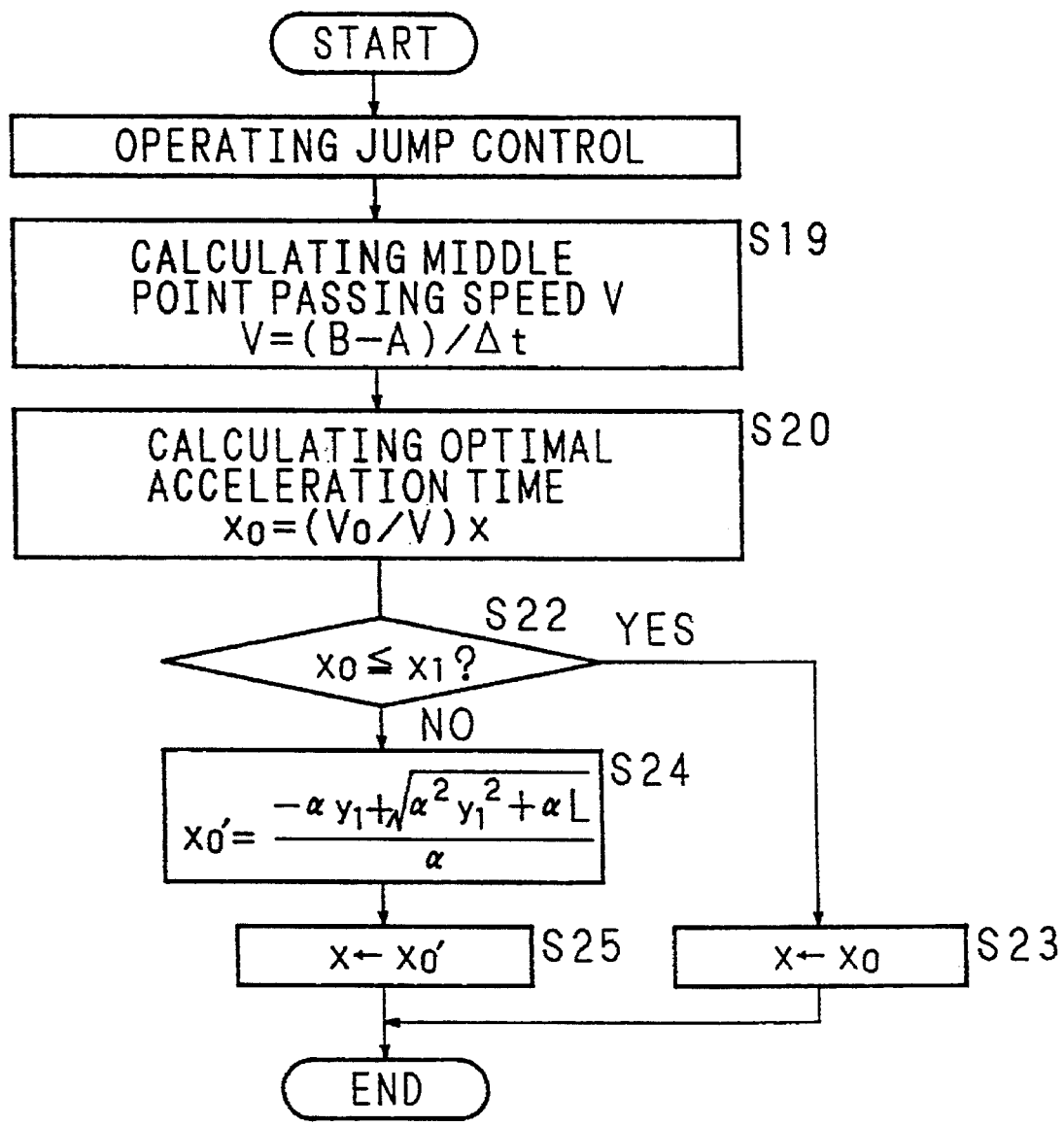
FIG. 9 is a flow chart showing the procedures for a correction calculation of optimal acceleration time according to the embodiment.

FIG. 9 is a flow chart in which the aforementioned correction calculation is added to the flow chart, of FIG. 8 according to the second embodiment. In the flow chart of FIG. 9, the procedures from step S11 to step S18 of FIG. 8 are indicated as merely the jump control operation.

As is shown in the flow chart of FIG. 9, after obtaining the optimal acceleration time $x_0$ in step S20, optimal acceleration time $x_0$ is compared with the upper limit acceleration time $x_1$ in step S22. When the time $x_0$ is smaller than the time $x_1$, the operation proceeds to step S23 to update the output time x for the acceleration signal and the deceleration signal into the time $x_0$. When the time $x_0$ exceeds the time $x_1$ and the minimum halt period $y_1$ cannot be provided, the operation proceeds to step S24 to calculate the optimal acceleration time $x_0'$ by equation (5), and update the out pull time x for the acceleration and deceleration signals into the time $x_0'$ (step S25). This correction calculation specifically means reduction of a predetermined value of the middle point passing speed used in correcting the output time x for the acceleration and deceleration signals. The correction calculation is also applicable to the flow chart of FIG. 6.

Figure 10:
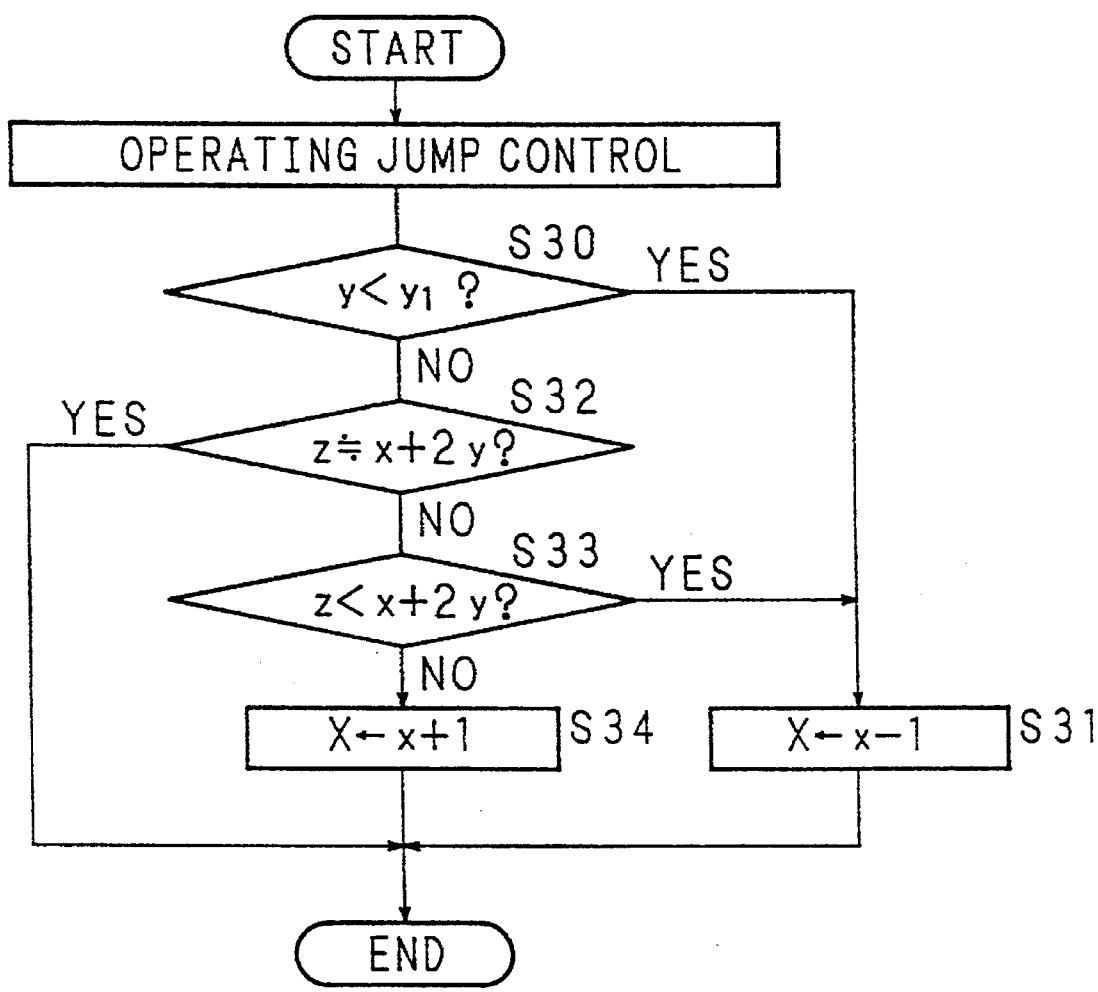
FIG. 10 is a flow chart showing the procedures for correction of acceleration time requiring less calculation according to the embodiment.

In the aforementioned embodiment, the optimal acceleration time $x_0$ is calculated so as to rapidly make the middle point passing speed accord with the target speed $V_0$. For this purpose, a mass of calculation in steps is required as above. FIG. 10 is a flow chart for the procedures for the acceleration time correction with less calculation.

In the procedures shown in the flow chart of FIG. 10, an optimal value z for the acceleration time and the hair period to attain the optimal speed $V_0$ is previously set. Based on the result of comparing the optimal value z with the current acceleration time x and halt period y, the acceleration time x is increased or decreased in a stepwise manner, thereby attaining the optimal acceleration time $x_0$. The optimal value z is an optimal value of (x+2y ), which can be obtained by substituting the target speed $V_0$ with the speed V in equation (4).

Similarly, to the flow chart of FIG. 9, also in the flow chart of FIG. 10, the procedures from step S11 to step S18 of FIG. 8 are indicated as the jump control operation. After this jump control operation, a current halt period y and the minimum halt period $y_1$ are compared (step S30). As a result, when the period y is smaller than the period $y_1$, which means that it is impossible to provide the minimum halt period $y_1$, the halt period is increased by obtaining new acceleration time X by subtracting unit time from the current acceleration time x (step S31).

When the period y is equal to or larger than the period $y_1$ as a result of comparison at step S30, it is checked whether or not the optimal value z is larger than the value of (x+2y) by substituting the acceleration time x and the halt period y in the subsequent jump operation (steps S32 and S33). When the optimal value z is substantially equal to the value of (x+2y) with a difference within a predetermined error range, the acceleration time x remains the same. In the case optimal value z is not equal to the value of (x+2y), the operation proceeds as follows. When the value of (x+2y) exceeds the optimal value z, the operation proceeds to the step S31 described above. When the optimal value z exceeds the value of (x+2y), the operation proceeds to step S34. In the former case, new acceleration time X is obtained by subtracting unit time from the current acceleration time x. In the latter case, new acceleration time X is obtained by adding unit time to the current acceleration time x. Thus, the procedures are finished.

In this manner, the operation is performed only by comparing the optimal value z with the acceleration time x and the halt period y used in the jump operation. Therefore, there is no need for complicated calculations such as the calculation for the middle point passing speed and the correction calculation for the optimal acceleration time $x_0$. In these procedures, the acceleration time x is updated in a stepwise manner by adding or subtracting unit time at steps S34 and S31. When such procedures are used, the light beam irradiating position attains a predetermined optimal value through a plurality of correction calculations each conducted at every rotation of the optical disk D. The rotation speed of the optimal disk D is, however, generally 3600 rpm, and hence, sixty correction calculations are conducted per one second. Therefore, the convergence for the optimal value can be attained within one second.

Although the correction by the jump controller 2 is performed on the output time for the acceleration and deceleration signals in the jump signal in this embodiment, it is possible to correct the levels of the acceleration and deceleration signals instead.

Further, in the aforementioned embodiments, the light beam irradiating position jumps inward on the optical disk D. The jumping direction is not limited to this, and the light beam irradiating position can jump outward, i.e., to the outer adjacent recording track.

As described above, in the optical disk device of the invention, the moving state of a light beam irradiating position on the optical disk is detected by jump detecting means, and acceleration and deceleration signals are corrected based on the detected result. In the subsequent jump operation, the corrected acceleration and deceleration signals are outputted with a halt period therebetween to actuate an optical head. Therefore, an individual difference in the characteristic of the optimal head or the variation of the characteristic with time can be canceled so as to attain an accurate jump operation. As a result, there is no need to require a high accuracy in processing or assembling the optical head to decrease the deviation in the characteristic thereof. Accordingly, it is possible to increase the productivity and provide an inexpensive optical disk device.

Further, the acceleration and deceleration signals are corrected by correcting the output time so that the speed of the light beam irradiating position to pass through the middle point between the recording tracks after and before the jump operation accord with a predetermined target speed. The middle point passing speed used at this point is supplied to the jump controller through the jump detecting means, or calculated by the jump controller on the basis of the detection of the passage by the jump detecting means and the output time for the acceleration signal. Therefore, an appropriate correction can be made without, using specific detection and complicated calculations.

Furthermore, when the halt period is made smaller than a predetermined reference value through the correction, a sufficient halt period is provided by subtracting a predetermined value from the middle point passing speed used in the correction. Accordingly, the deceleration in response to the deceleration signal is always started while the light beam irradiating position is moving at a fixed speed. As a result, the invention bas such an excellent effect that the position of the light beam irradiating position after finishing the deceleration can be effectively prevented from being deviated.

As this invention may be embodied in several forms without departing from the spirit of essential characteristics thereof, the present embodiment is therefore illustrative and not restrictive, since the scope of the invention is defined by the appended claims rather than by the description preceding them, and all changes that fail within metes and bounds of the claims, or equivalence of such metes and bounds thereof are therefore intended to be embraced by the claims.

What is claimed is:

1. An optical disk device in which an optical disk having a spirally formed recording track is irradiated with a light beam and a beam irradiating position on said optical disk is moved from one recording track to an adjacent recording track at every rotation of said optical disk, comprising:

a movable optical head for emitting the light beam;

jump signal generating means for generating a jump signal including an acceleration signal for accelerating said optical head, a deceleration signal corresponding to said acceleration signal, and a halt period between said acceleration signal and said deceleration signal;

jump detecting means for detecting a moving state of the beam irradiating position moved in response to said jump signal; and a jump controller for correcting an output time of said acceleration signal and said deceleration signal based on a detection result obtained by said jump detecting means.

2. An optical disk device according to claim 1, wherein said jump detecting means detects a speed at which the beam irradiating position passes through a substantial middle point between the recording tracks on which the beam irradiating position is positioned before and after the movement, and said jump controller corrects said acceleration signal and said deceleration signal so that the speed detected by said jump detecting means accord with a predetermined target speed.

3. An optical disk device according to claim 2, wherein said jump controller sets a predetermined reference value for said halt period, and when the halt period defined through the correction of said acceleration signal and said deceleration signal has a smaller value than said reference value, said jump controller reduces said target speed so that the halt period be not less than said reference value.

4. An optical disk device in which an optical disk having a spirally formed recording track is irradiated with a light beam and a beam irradiating position on said optical disk is moved from one recording track to an adjacent recording track at every rotation of said optical disk, comprising:

a movable optical head for emitting the light beam;

jump signal generating means for generating a jump signal including an acceleration signal for accelerating said optical head, a deceleration signal corresponding to said acceleration signal, and a halt period between said acceleration signal and said deceleration signal;

jump detecting means for detecting a moving state of the beam irradiating position moved in response to said jump signal, wherein said jump detecting means detect a time at which the beam irradiating position passes through a substantial middle point between the recording tracks on which the beam irradiating position is positioned before and after the movement; and a jump controller for correcting an output time of said acceleration signal and said deceleration signal based on a detection result obtained by said jump detecting means, said jump controller including means for calculating a speed at which the beam irradiating position passes through said substantial middle point based on said time detected by said jump detecting means and an output time for said acceleration signal, and correcting said acceleration signal and said deceleration signal so that the calculated speed accord with a predetermined target speed.

5. An optical disk device according to claim 4, wherein said jump controller corrects said output time for said acceleration signal and said deceleration signal based on said detection result obtained by said jump detecting means.

6. An optical disk device in which an optical disk having a spirally formed recording track is irradiated with a light beam and a beam irradiating position on said optical disk is moved from one recording track to an adjacent recording track at every rotation of said optical disk, comprising:

a movable optical head for emitting the light beam;

jump signal generating means for generating a jump signal including an acceleration signal for accelerating said optical head, a deceleration signal corresponding to said acceleration signal, and a halt period between said acceleration signal and said deceleration signal;

jump detecting means for detecting a moving state of the beam irradiating position moved in response to said jump signal; and a jump controller for correcting an output time of said acceleration signal and said deceleration signal based on a detection result obtained by said jump detecting means, wherein said jump controller sets a predetermined reference value for said halt period, and when said halt period defined through the correction of said acceleration signal and said deceleration signal has a smaller value than said reference value, said jump controller reduces a predetermined target speed so that said halt period is not less than said reference value.

7. An optical disk device according to claim 6, wherein said jump controller corrects output time for said acceleration signal and deceleration signal based on a detection result obtained by said jump detecting means.

* * * * *

UNITED STATES PATENT AND TRADEMARK OFFICE
CERTIFICATE OF CORRECTION

PATENT NO. : 5,648,947
DATED : July 15, 1997
INVENTOR(S) : Hamaguchi et al.

It is certified that error appears in the above-identified patent and that said Letters Patent is hereby corrected as shown below:

Column 1, line 30, delete "actual, or" and insert -- actuator-- therefor.

Column 1, line 40, delete "light, beam" and insert-- light beam-- therefor.

Column 1, line 42, delete "on art" and insert --on an-- therefor.

Column 1, line 49, delete "light, beam" and insert -- light beam-- therefor.

UNITED STATES PATENT AND TRADEMARK OFFICE
CERTIFICATE OF CORRECTION

PATENT NO. : 5,648,947
DATED : July 15, 1997
INVENTOR(S) : Hamaguchi et al.

It is certified that error appears in the above-identified patent and that said Letters Patent is hereby corrected as shown below:

Column 1, line 57, delete "bet,ween" and insert --between-- therefor.

Column 2, line 1, delete "As strewn" and insert --As is shown -- therefor.

Column 2, line 5, delete "(not; shown)" and insert --(not shown)-- therefor.

Column 2, line 18, delete "also reflected s" and insert --also reflects-- therefor.

Column 2, line 21, delete "light, beam" and insert --light beam-- therefor.

UNITED STATES PATENT AND TRADEMARK OFFICE
CERTIFICATE OF CORRECTION

PATENT NO. : 5,648,947
DATED : July 15, 1997
INVENTOR(S) : Hamaguchi et al.

It is certified that error appears in the above-identified patent and that said Letters Patent is hereby corrected as shown below:

Column 2, line 33, delete "direct ion" and insert --direction-- therefor.

Column 2, line 60, delete "optical bead" and insert --optical head-- therefor.

Column 2, line 65, delete "Lime." and insert --time.-- therefor.

Column 3, line 7, delete "mount, the" and insert --mount the-- therefor.

Column 3, line 27, delete "difficult, to" and insert --difficult to-- therefor.

UNITED STATES PATENT AND TRADEMARK OFFICE
CERTIFICATE OF CORRECTION

PATENT NO. : 5,648,947
DATED : July 15, 1997
INVENTOR(S) : Hamaguchi et al.

It is certified that error appears in the above-identified patent and that said Letters Patent is hereby corrected as shown below:

Column 3, line 42, delete "the acceleration" and insert --the deceleration-- therefor.

Column 4, line 39, delete "so that, the" and insert --so that the -- therefor.

Column 5, line 49, delete "light, beam" and insert --light beam-- therefor.

Column 5, line 58, delete "movement, of" and insert --movement of-- therefor.

Column 6, line 2, delete "on-track-control led" and insert --on-track-controlled-- therefor.

UNITED STATES PATENT AND TRADEMARK OFFICE
CERTIFICATE OF CORRECTION

PATENT NO. : 5,648,947
DATED : July 15, 1997
INVENTOR(S) : Hamaguchi et al.

It is certified that error appears in the above-identified patent and that said Letters Patent is hereby corrected as shown below:

Column 6, line 7, delete "(seek-control led)" and insert --(seek controlled)-- therefor.

Column 6, line 21, delete "output, signal" and insert --output signal-- therefor.

Column 6, line 23, delete "disk D)." and insert --disk D.-- therefor.

Column 6, line 27, delete "1a, a so" and insert --1a so-- therefor.

Column 6, line 32, delete "so that, the " and insert --so that the-- therefor.

UNITED STATES PATENT AND TRADEMARK OFFICE
CERTIFICATE OF CORRECTION

PATENT NO. : 5,648,947
DATED : July 15, 1997
INVENTOR(S) : Hamaguchi et al.

It is certified that error appears in the above-identified patent and that said Letters Patent is hereby corrected as shown below:

Column 6, line 46, delete "that, is" and insert --that is-- therefor.

Column 6, line 51, delete "obtained througb" and insert --obtained through-- therefor.

Column 6, line 52, delete "obtained througb" and insert --obtained through-- therefor.

Column 6, line 54, delete "input, to" and insert --input to-- therefor.

Column 6, line 57, delete "adjacent, to" and insert --adjacent to-- therefor.

UNITED STATES PATENT AND TRADEMARK OFFICE
CERTIFICATE OF CORRECTION

PATENT NO. : 5,648,947
DATED : July 15, 1997
INVENTOR(S) : Hamaguchi et al.

Page 7 of 12

It is certified that error appears in the above-identified patent and that said Letters Patent is hereby corrected as shown below:

Column 7, line 2, delete "the photosensor" and insert --the photosensors-- therefor.

Column 7, line 15, delete "at, O level" and insert --at O level-- therefor.

Column 7, line 19, delete "tracks $T_l$" and insert --tracks $T_1$-- therefor.

Column 7, line 27, delete "switch the" and insert --switch in the -- therefor.

Column 7, line 30, delete "movement, of" and insert --movement of-- therefor.

UNITED STATES PATENT AND TRADEMARK OFFICE
CERTIFICATE OF CORRECTION

PATENT NO. : 5,648,947
DATED : July 15, 1997
INVENTOR(S) : Hamaguchi et al.

It is certified that error appears in the above-identified patent and that said Letters Patent is hereby corrected as shown below:

Column 7, line, 31, delete "output, of" and insert --output of-- therefor.

Column 7, line 45, delete "output, signals" and insert --output signals-- therefor.

Column 7, line 50, delete "(A/D)) convert" and insert --(A/D) converter-- therefor.

Column 8, line 52, delete "a hall" and insert --a halt-- therefor.

Column 8, line 65, delete "the hall" and insert --the halt-- therefor.

UNITED STATES PATENT AND TRADEMARK OFFICE
CERTIFICATE OF CORRECTION

PATENT NO. : 5,648,947
DATED : July 15, 1997
INVENTOR(S) : Hamaguchi et al.

It is certified that error appears in the above-identified patent and that said Letters Patent is hereby corrected as shown below:

Column 9, line 4, delete "merely jump" and insert --merely the jump-- therefor.

Column 9, line 22, delete "output, of" and insert --output of-- therefor.

Column 9, line 32, delete "output hall" and insert --output halt-- therefor.

Column 10, line 11, delete "output, part" and insert --output part-- therefor.

Column 10, line 41, delete "output: time" and insert --output time-- therefor.

UNITED STATES PATENT AND TRADEMARK OFFICE
CERTIFICATE OF CORRECTION

PATENT NO. : 5,648,947
DATED : July 15, 1997
INVENTOR(S) : Hamaguchi et al.

Page 10 of 12

It is certified that error appears in the above-identified patent and that said Letters Patent is hereby corrected as shown below:

Column 11, line 4, delete "$\Delta$t, indicates" and insert --$\Delta$t indicates-- therefor.

Column 11, line 5, delete "equal, ion (2)" and insert --equation (2)-- therefor.

Column 11, line 6, delete "at, the" and insert --at the-- therefor.

Column 11, line 10, delete "output, time" and insert --output time-- therefor.

Column 11, line 16, delete "this mariner," and insert --this manner-- therefor.

UNITED STATES PATENT AND TRADEMARK OFFICE
CERTIFICATE OF CORRECTION

PATENT NO. : 5,648,947
DATED : July 15, 1997
INVENTOR(S) : Hamaguchi et al.

It is certified that error appears in the above-identified patent and that said Letters Patent is hereby corrected as shown below:

Column 11, line 48, delete "can, be" and insert --can be-- therefor.

Column 12, line 13, delete "chart, of" and insert --chart of-- therefor.

Column 12, line 18, delete "520, optimal" and insert --S20, the optimal-- therefor.

Column 12, line 26, delete "the out pull" and insert --the output-- therefor.

Column 12, line 40, delete "the hair" and insert --the halt-- therefor.

UNITED STATES PATENT AND TRADEMARK OFFICE
CERTIFICATE OF CORRECTION

PATENT NO. : 5,648,947
DATED : July 15, 1997
INVENTOR(S) : Hamaguchi et al.

It is certified that error appears in the above-identified patent and that said Letters Patent is hereby corrected as shown below:

Column 13, line 61, delete "without, using" and insert --without using-- therefor.

Signed and Sealed this

First Day of September, 1998

Attest:

BRUCE LEHMAN

*Attesting Officer*     *Commissioner of Patents and Trademarks*